(12) United States Patent
Rodrigues et al.

(10) Patent No.: US 7,235,737 B2
(45) Date of Patent: Jun. 26, 2007

(54) ELECTROMAGNETIC SHIELDING SLEEVE WHICH IS INTENDED, FOR EXAMPLE, TO PROTECT BUNDLES OF CABLES FOR USE IN AERONAUTICS

(75) Inventors: Thierry Rodrigues, Ecouen (FR); Andre Lernon, Mareuil sur Ourcq (FR); Fabrice Dumont, Compiegne (FR); Ranier Koch, Gilocourt (FR)

(73) Assignee: Federal Mugul Systems Protection Group, Crepy En Valois (FR)

( * ) Notice: Subject to any disclaimer, the term of this patent is extended or adjusted under 35 U.S.C. 154(b) by 0 days.

(21) Appl. No.: 10/550,727

(22) PCT Filed: Mar. 22, 2004

(86) PCT No.: PCT/FR2004/000695

§ 371 (c)(1),
(2), (4) Date: Sep. 26, 2005

(87) PCT Pub. No.: WO2004/086582

PCT Pub. Date: Oct. 7, 2004

(65) Prior Publication Data

US 2006/0185872 A1 Aug. 24, 2006

(30) Foreign Application Priority Data

Mar. 24, 2003 (FR) .................................. 03 03552

(51) Int. Cl.
*H01B 11/06* (2006.01)
(52) U.S. Cl. ........................................................ 174/36
(58) Field of Classification Search .................. 174/36
See application file for complete search history.

(56) References Cited

U.S. PATENT DOCUMENTS

| 2,358,743 | A | * | 9/1944 | Smith .......................... 138/128 |
| 3,612,744 | A | * | 10/1971 | Thomas ....................... 174/36 |
| 4,734,598 | A | * | 3/1988 | Bohme ....................... 327/336 |
| 5,003,126 | A | * | 3/1991 | Fujii et al. .................... 174/36 |
| 5,367,123 | A | * | 11/1994 | Plummer et al. ............. 174/36 |
| 6,085,416 | A | | 7/2000 | Ikeda |
| 6,936,553 | B2 | * | 8/2005 | Von Samson-Himmelstjerna ............ 442/149 |

FOREIGN PATENT DOCUMENTS

| FR | 1 509 648 | 1/1968 |
| JP | 10 224943 | 8/1998 |
| JP | 11 121969 | 4/1999 |
| JP | 11 215642 | 8/1999 |

\* cited by examiner

*Primary Examiner*—Chau N. Nguyen
(74) *Attorney, Agent, or Firm*—Robert L. Stearns; Dickinson Wright PLLC

(57) ABSTRACT

A tubular electromagnetic shielding sleeve has a longitudinal slit. The inventive sleeve includes a substrate (11) and a layer (12) of electrically-conductive material which is fixed to the inner face of the substrate (11), the layer (12) extending essentially from one edge (11a) to the other longitudinal edge (11b) of the substrate (11). Moreover, the substrate (11) and the layer (12) are separated from one another along a split segment (13) on at least one first longitudinal edge (11a). The invention can be used, for example, to protect bundles of electric cables (14) for use in aeronautics.

16 Claims, 1 Drawing Sheet

ELECTROMAGNETIC SHIELDING SLEEVE WHICH IS INTENDED, FOR EXAMPLE, TO PROTECT BUNDLES OF CABLES FOR USE IN AERONAUTICS

BACKGROUND OF THE INVENTION

The present invention relates to an electromagnetic shielding sleeve used in particular in the field of aeronautics to protect bundles of electrical cables.

The present invention applies generally to protecting wires, cables or bundles of wires by electromagnetically shielding them in order to protect them from electromagnetic interference and radio-frequency interference.

This type of electromagnetic protection is routinely used in the automotive, rail cabling and aeronautical fields.

Electromagnetic interference protection standards are drawn up for each field of application and may require protection of the order of 40 to 45 dB in the automotive field or of the order of 80 to 90 dB in the aeronautical field.

Self-closing sleeves of polyester fabric coated with copper or nickel for providing electromagnetic protection are known in the automotive field, for example.

Electrical continuity is provided by an overlap on the outside face of the textile sleeve, where a folded longitudinal edge produces copper-to-copper contact.

A protective sleeve of the above kind is described in the document EP 1 175 683 in particular.

However, this kind of sleeve can offer only low protection to interference and is therefore difficult to transpose to the aeronautical field.

In the aeronautical field, maximum efficiency in terms of electromagnetic shielding is obtained by using copper wires, for example in the form of a copper braid.

In the conventional way, copper wires are overbraided around the cable to be protected, for example with a coverage rate of around 75%. The coverage rates required in the aeronautical field are frequently in excess of 90%.

A layer overbraided with textile filaments may be added to provide mechanical protection of the bundle of cables and the copper shielding.

However, the above shielding is difficult to fit to a bundle of cables.

Moreover, it is particularly difficult, or even impossible, to maintain and replace shielding and mechanical protection elements if the bundles of cables are installed and connected in their operational configuration.

SUMMARY OF THE INVENTION

An object of the present invention is to eliminate the problems cited above and to propose an electromagnetic shielding sleeve providing efficient shielding at lower cost, in particular in the aeronautical field.

To this end, the present invention is directed to a longitudinally slit tubular electromagnetic shielding sleeve comprising a substrate and an electrically conductive material layer fixed to an internal face of the substrate, said layer extending substantially from one longitudinal edge of the substrate to the other longitudinal edge thereof.

According to the invention, said substrate and the electrically conductive material layer are separated in a split segment at one first longitudinal edge at least.

This split segment thus forms a housing adapted to receive the second longitudinal edge of the substrate, so that electrical continuity can be produced in the layer of electrically conductive material that is fixed from one edge of the substrate to the other edge thereof.

Thanks to this split segment, electrical continuity may be produced inside the sleeve, so that this area of electrical contact is protected by the first longitudinal edge of the substrate on the outside face of the sleeve.

Furthermore, thanks to the longitudinally slit substrate, it is easy to fit and in particular to replace a worn out sleeve, even if the bundles of cables are positioned for their final application. This facilitates maintenance and retro-fit operations.

In a preferred embodiment of the invention, said electrically conductive material layer is formed of an interleaved copper wire structure, providing a high density of copper to assure efficient shielding of the bundles of cables.

A braided copper wire structure produces a high rate of coverage by the electrically conductive material around the cables to be protected.

According to another preferred feature of the invention, the substrate is produced in the form of a sheet thermoformed into a self-curling strip with an overlap.

Thus the shape of the substrate greatly facilitates fitting the sleeve with an overlap producing electrical continuity in the split segment of the sleeve.

Thus the second longitudinal edge of the sleeve is adapted to be inserted between the substrate and the electrically conductive material layer in the split segment.

This sleeve is particularly suitable for protecting bundles of electrical cables in the aeronautical field, but may also be used in the automotive and rail sectors.

Further features and advantages of the invention will become apparent in the course of the following description.

BRIEF DESCRIPTION OF THE DRAWINGS

In the appended drawing, which is provided by way of non-limiting example.

DESCRIPTION OF THE PREFERRED EMBODIMENTS

Figure 1:
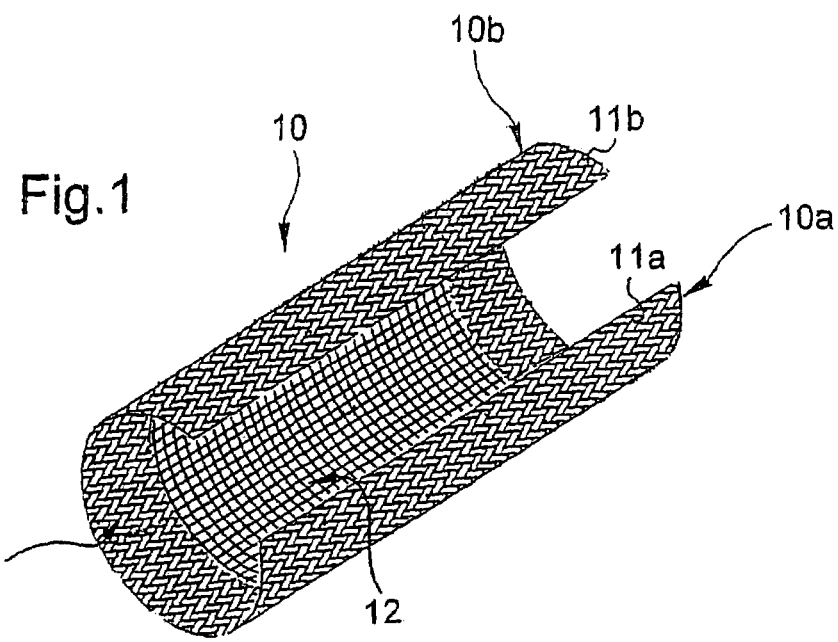
FIG. 1 is a perspective view of an electromagnetic shielding sleeve of the invention.

The general principle of an electromagnetic shielding sleeve of the invention is described first with reference to FIG. 1.

The general shape of the sleeve 10 is that of a slit tube.

In the present example the sleeve more particularly comprises a substrate 11 adapted to curl up on itself to form a longitudinally slit tube.

This substrate is preferably produced from a plane strip in the form of a thermoformed sheet. The thermoforming operation converts the flat strip into a self-curling strip with an overlap, the longitudinal edges 10a, 10b of the sleeve being adapted to come into contact with each other in an overlap portion.

The substrate is preferably a woven textile strip. The textile filaments may be polyester monofilaments and/or multifilaments, for example.

For example, polyphenylene sulfide (PPS) filaments may be used.

Alternatively, a substrate may be produced from NOMEX® from du Pont de Nemours.

The NOMEX® or PPS substrate provides effective mechanical protection of the cables to be protected.

A NOMEX® substrate has the additional advantage of good fire resistance.

According to the invention, this textile substrate 11 is associated with an electrically conductive material layer 12.

The layer 12 is preferably formed from braided copper wires.

Tinned or nickel-plated copper wires may be used, and copper wires with a diameter from 0.10 mm to 0.25 mm, and preferably from 0.12 mm to 0.15 mm, can be braided to form an elongate strip of conductive material.

The braiding technique produces a strip in which the rate of coverage by the copper is of the order of 92% of the total area of the strip.

This copper layer 12 is fixed to an internal face 11c of the substrate so as to extend from one longitudinal edge 11a of the substrate 11 to the other longitudinal edge 11b thereof.

As clearly shown in FIG. 1, this conductive material layer may extend over only a limited longitudinal portion of the sleeve 10.

Of course, this layer 12 may equally extend over the whole of the length of the sleeve 10.

Figure 2:
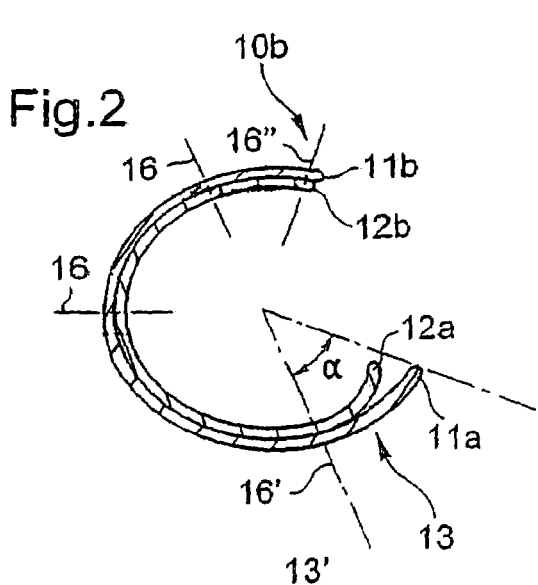
FIG. 2 is a view of a first embodiment of an electromagnetic shielding sleeve of the invention.

As clearly shown in FIG. 2, in a first embodiment, the substrate 11 and the layer 12 are separated in a split segment 13 along a first longitudinal edge 11a of the substrate 11.

Accordingly, in this split segment 13, the second longitudinal edge 10b of the sleeve may be inserted between the substrate 11 and the layer 12.

The split segment 13 subtends an angle α that is sufficient to allow sufficient insertion of the second longitudinal edge 10b into this split segment 13.

The angle α may be substantially equal to 90°, for example.

Figure 3:
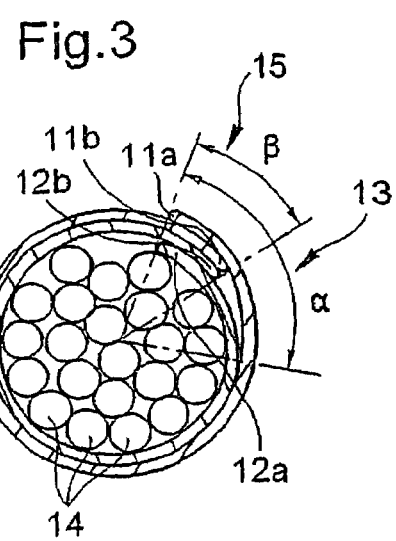
FIG. 3 is a view in cross section of the first embodiment of an electromagnetic shielding sleeve of the invention fitted around a bundle of cables.

As shown clearly in FIG. 3, when this sleeve 10 is fitted around a bundle of cables 14, the second longitudinal edge 10b of the sleeve 10 is inserted between the layer 12 of conductive material and the substrate, more particularly the first longitudinal edge 11a of the substrate, so that electrical continuity may be obtained in the layer 12, thanks to contact between the longitudinal edges 12a, 12b of the copper layer 12.

Thus there exists an overlap portion 15 in which one longitudinal edge 10a of the sleeve 10 overlaps the other longitudinal edge 10b thereof. This overlap portion 15 subtends an angle β from 60° to 90° with respect to the longitudinal axis of the tubular substrate 11.

This overlap portion 15 is larger or smaller according to the diameter of the bundles of cables 14 to be protected, what is important being to have good contact between the two longitudinal edges.

Figure 4:
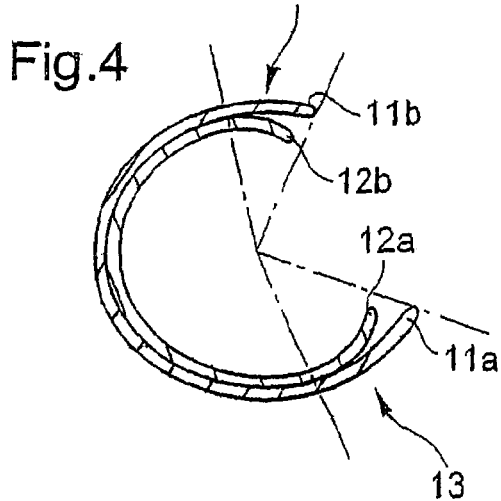
FIG. 4 is an end view of a second embodiment of an electromagnetic shielding sleeve of the invention.

A second embodiment of the electromagnetic shielding sleeve of, the invention is described next with reference to FIGS. 4 and 5.

In this embodiment, the substrate 11 and the electrically conductive material layer 12 are separated in two split segments 13 and 13', one of these split segments 13 being adjacent to the first longitudinal edge 10a of the sleeve 10 and the other split segment 13' being adjacent to the second longitudinal edge 10b of the sleeve.

Figure 5:
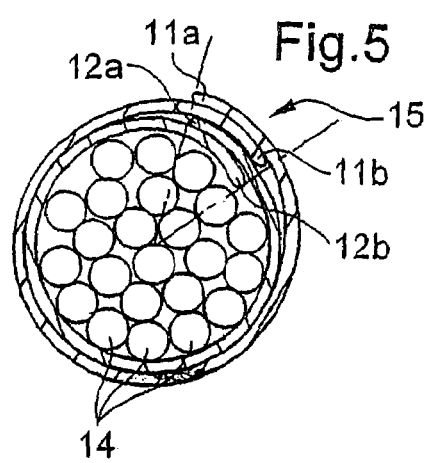
FIG. 5 is a view in cross section of the second embodiment of an electromagnetic shielding sleeve of the invention fitted around a bundle of cables.

Accordingly, as shown clearly in FIG. 5, these split segments 13, 13' are adapted to be interleaved in an overlap portion 15' so that the edges 12a, 12b of the conductive layer come into contact with each other inside the sleeve and the longitudinal edges 11a, 11b of the substrate come into contact with each other outside the sleeve.

Accordingly, in both embodiments described above, electrical continuity of the conductive material layer 12 is produced inside the sleeve 10, the substrate 11 covering this contact portion to maintain the electrical connection mechanically.

Reliable and efficient shielding is thus obtained, suitable for bundles of aeronautical cables.

This electromagnetic shielding sleeve may be fabricated by sewing the electrically conductive material layer 12 to the substrate 11 by means of one or more rows of stitches 16, 16', 16'' extending in the longitudinal direction of the sleeve 10, for example.

At least one of the rows of stitches 16' is sufficiently far from one longitudinal edge 10a of the sleeve to allow separation of the substrate and the layer 12 in the vicinity of that longitudinal edge.

If the substrate is a thermoformed textile woven strip, the copper braid is fixed to the textile woven strip by lines of stitches before the thermoforming step.

Alternatively, this sleeve could be produced by a tube weaving process, one layer being made of copper wires and one layer being made of textile filaments. A double weaving process of this kind would eliminate the operation of fixing the copper layer to the textile filament layer during fabrication of the sleeve.

The electromagnetic shielding sleeve of the invention therefore achieves efficient shielding and is simple to use around bundles of cables to be protected, even if the latter are installed in an engine and connected up, for example.

Of course, many modifications may be made to the embodiment described above without departing from the scope of the invention.

In particular, in the second embodiment, in which a split segment is provided at both longitudinal edges of the sleeve, one of the longitudinal edges, comprising both the substrate and the electrically conductive material layer, may be inserted integrally between the substrate and the conductive material layer of the other longitudinal edge.

Moreover, the edges 12a, 12b of the electrically conductive material layer 12 may extend more or less as far as the longitudinal edges 11a, 11b of the substrate 11 if it suffices to produce a small area of overlap of the two edges 12a, 12b of the electrically conductive material to provide electrical continuity.

Furthermore, the tubular sleeve could be formed, instead of from a self-curling strip, from a plain strip adapted to be curled up around a bundle of cables and held in that position by fixing means such as cable ties or rings distributed along the length of the sleeve.

Moreover, the substrate may be formed of a knitted or braided textile strip.

Similarly, the conductive material layer may be made from woven copper wires.

The invention claimed is:

1. Longitudinally slit tubular electromagnetic shielding sleeve comprising:
a substrate (11) and an electrically conductive material layer (12) fixed to an internal face (11c) of the substrate (11), said layer (12) extending substantially from a first longitudinal edge (11a) of the substrate (11) to a second longitudinal edge (11b) thereof, wherein the substrate (11) and said layer (12) are separated in a split segment (13) at said first longitudinal edge (11*a*) at least, said substrate and said layer at said second longitudinal edge being inside said split segment between said substrate and said layer at said first longitudinal edge.

2. Electromagnetic shielding sleeve according to claim 1, wherein said layer (12) is an interleaved copper wire structure.

3. Electromagnetic shielding sleeve according to claim 2, wherein said copper wire structure comprises braided copper wires.

4. Electromagnetic shielding sleeve according to claim 1, wherein said substrate (11) is a sheet thermoformed into a self-curling strip with an overlap.

5. Electromagnetic shielding sleeve according to claim 1, wherein said substrate (11) is a textile strip.

6. Electromagnetic shielding sleeve according to claim 1, wherein said substrate is a woven textile.

7. Electromagnetic shielding sleeve according to claim 1, wherein said electrically conductive material layer (12) is fixed to said substrate (11) by one or more rows of stitches (16, 16', 16") extending in the longitudinal direction of said sleeve (10).

8. Electromagnetic shielding sleeve according to claim 1, wherein said split segment (13) subtends an angle (α) approximately equal to 90°.

9. Electromagnetic shielding sleeve according to claim 1, wherein an overlap portion (15) of the first longitudinal edge (10*a*) on the second longitudinal edge (10*b*) subtends an angle (β) from 60° to 90°.

10. Longitudinally slit tubular electromagnetic shielding sleeve comprising:

a substrate (11) and an electrically conductive material layer (12) fixed to an internal face (11*c*) of the substrate (11), said layer (12) extending substantially from a first longitudinal edge (11*a*) of the substrate (11) to a second longitudinal edge (11*b*) thereof, wherein the substrate (11) and said layer (12) are separated in a first split segment (13) at said first longitudinal edge (11*a*) and in a second split segment (13') at said second longitudinal edge, said substrate at said second longitudinal edge being inside said first split segment between said substrate and said layer at said first longitudinal edge and said layer at said first longitudinal edge being inside said second split segment between said substrate and said layer at said second longitudinal edge.

11. Electromagnetic shielding sleeve according to claim 10, wherein said layer (12) is an interleaved copper wire structure.

12. Electromagnetic shielding sleeve according to claim 10, wherein said substrate (11) is a sheet thermoformed into a self-curling strip with an overlap.

13. Electromagnetic shielding sleeve according to claim 10, wherein said substrate (11) is a textile strip.

14. Electromagnetic shielding sleeve according to claim 10, wherein said electrically conductive material layer (12) is fixed to said substrate (11) by one or more rows of stitches (16, 16', 16") extending in the longitudinal direction of said sleeve (10).

15. Electromagnetic shielding sleeve according to claim 10, wherein said first split segment (13) subtends an angle (α) approximately equal to 90°.

16. Electromagnetic shielding sleeve according to claim 10, wherein an overlap portion (15) of the first longitudinal edge (10*a*) on the second longitudinal edge (10*b*) subtends an angle (β) from 60° to 90°.

\* \* \* \* \*